United States Patent [19]

Meuer et al.

[11] Patent Number: 5,023,299
[45] Date of Patent: Jun. 11, 1991

[54] POLYOLEFINECARBOXYLIC ACIDS, THEIR PREPARATION AND THEIR USE FOR PREPARING POLYOLEFINE-POLYCARBONATE BLOCK COPOLYMERS

[75] Inventors: Kurt P. Meuer; Helmut Waniczek, both of Cologne; Gerd Sylvester, Leverkusen; Josef Witte, Cologne, all of Fed. Rep. of Germany

[73] Assignee: Bayer Aktiengesellschaft, Bayerwerk, Fed. Rep. of Germany

[21] Appl. No.: 473,495

[22] Filed: Feb. 1, 1990

Related U.S. Application Data

[62] Division of Ser. No. 250,014, Sep. 27, 1988, Pat. No. 4,929,689, which is a division of Ser. No. 50,165, May 14, 1987, Pat. No. 4,798,873.

[30] Foreign Application Priority Data

May 31, 1986 [DE] Fed. Rep. of Germany ....... 3618378

[51] Int. Cl.$^5$ ...................... C08G 81/02; C08G 64/18
[52] U.S. Cl. .................................... 525/146; 525/468; 528/196
[58] Field of Search ........................ 525/146, 148, 468; 528/196

[56] References Cited

U.S. PATENT DOCUMENTS

| | | | |
|---|---|---|---|
| 3,135,716 | 6/1964 | Uraneck et al. | 260/45.5 |
| 3,285,949 | 11/1966 | Siebert | 260/465.4 |
| 3,392,154 | 7/1968 | Baldwin | 260/77.5 |
| 3,427,351 | 2/1969 | Nakagawa et al. | 260/537 |
| 4,196,276 | 4/1980 | Schreckenberg et al. | 528/176 |
| 4,806,599 | 2/1989 | Priddy | 525/468 |
| 4,845,158 | 7/1989 | Peters | 525/354 |

FOREIGN PATENT DOCUMENTS

| | | |
|---|---|---|
| 1162559 | 2/1964 | Fed. Rep. of Germany . |
| 1520922 | 1/1970 | Fed. Rep. of Germany . |
| 2043508 | 2/1970 | Fed. Rep. of Germany . |
| 2148927 | 4/1972 | Fed. Rep. of Germany . |
| 2235952 | 6/1973 | France . |
| 945713 | 1/1964 | United Kingdom . |
| 965089 | 7/1964 | United Kingdom . |

OTHER PUBLICATIONS

Journal of Polymer Science 1969, pp. 1339–1347.
P. Pino and R. Mulhaupt in Angew. Chem. Int. 11, p. 869, 1980 (English version–857).
E. A. Youngmann, J. Boor in Marcomolecular Reviews, vol. 2, pp. 33–69, 1967.
W. Doorscheidt et al, Kunststoffe 66, p. 572, 1976 (along with English Language Translation).
Polyisobutylen (Polyisobutylene), H. Guterbock, Springer Verlag, Heidelberg, 1959.

Primary Examiner—John C. Bleutge
Assistant Examiner—David Buttner
Attorney, Agent, or Firm—Joseph C. Gil; Aron Preis

[57] ABSTRACT

The present invention relates to poly-($C_2$–$C_{10}$-α-olefine)-carboxylic acids of $\overline{M}w$ (weight average) 2000 to 350,000, to their preparation by oxidative degradation of polyolefines or by reaction of "Living" polyolefines with $CO_2$, to their conversion into poly-($C_2$–$C_{10}$-α-olefine)-carbonyl halides and to their use for preparing polyolefine/polycarbonate block copolymers and the block copolymers obtainable by the process according to the invention.

5 Claims, 1 Drawing Sheet

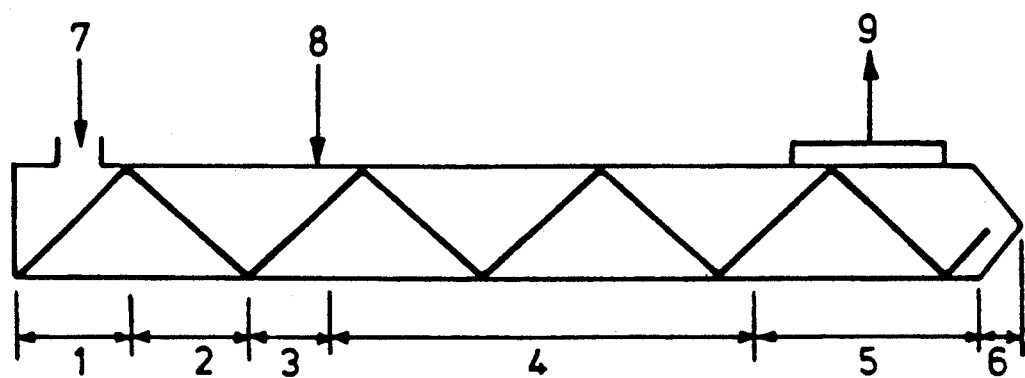

POLYOLEFINECARBOXYLIC ACIDS, THEIR PREPARATION AND THEIR USE FOR PREPARING POLYOLEFINE-POLYCARBONATE BLOCK COPOLYMERS

This application is a division, of application Ser. No. 07/250,014 now U.S. Pat. No. 4,929,689 filed Sept. 27, 1988, which is a division of application Ser. No. 07/050,165, filed May 14, 1987 now U.S. Pat. No. 4,798,873.

The present invention relates to poly-($C_2$–$C_{10}$-α-olefine)-carboxylic acids of molecular weight $\overline{M}w$ ($\overline{M}w$, weight average determined by coupling gel permeation chromatography with viscometry) 2000 to 350,000, preferably 70000 to 200000 and in particular 70000 to 100000.

Poly-($C_2$–$C_{10}$-α-olefine)-carboxylic acids is to be understood as meaning saturated carboxylic acids of polyolefines, such as, for example, polyethylene, polypropylene, polybutylene, or of copolymers of ethylene, propylene, hexene, butene and/or isobutylene, the carboxylic acid groups of which are preferably in the terminal position and which preferably have at most 2 COOH groups per molecule. Polystyrenecarboxylic acids are not to be subsumed thereunder.

The present invention also relates to a process for preparing poly-($C_2$–$C_{10}$-α-olefine)-carboxylic acids having molecular weights $\overline{M}w$ ($\overline{M}w$ determined as described above) of 2000 to 350,000, preferably of 70000 to 200000 and in particular of 70000 to 100000, which is characterized in that poly-($C_2$–$C_{10}$)-α-olefines of $\overline{M}w$ (determined as described above) 50000 to 355000 and a non-uniformity of at most about 10 (nonuniformity $U = Mw/Mn - 1$) are treated oxidatively at temperatures of 150° C. to 300° C. and possibly degraded.

For example, an extruder (ZSK 32) having a length-diameter ratio of 40 can be charged per hour with 6000 g of isotactic polypropylene having an $\overline{M}w$ of 355000 and a nonuniformity $U = (Mw/Mn - 1)$ of 9.4, heated to 250° C. to 260° C. and injected with 1500 Nl/hour of air under pressure, the cylinder temperature of the extruder downstream of the zone of the air injection being maintained at 210° C.

Excess air leaves in the degassing zone, and the resulting polypropylenecarboxylic acid is spun off at the die. After this first oxidation the resulting polypropylenecarboxylic acid has an $\overline{M}w$ of about 113000, a nonuniformity of 4.17 and a carboxyl group content of 0.7 carboxyl groups per molecule.

This product can be oxidatively extruded once more in the same way, the resulting polypropylenecarboxylic acid having an $\overline{M}w$ of 94000, a nonuniformity of 3.1 and a carboxyl group content of 1.3 carboxyl groups per molecule.

This product can be oxidatively extruded a third time, the resulting polypropylenecarboxylic acid having an $\overline{M}w$ of 70000, a nonuniformity of 4.3 and a carboxyl group content of 1.5 to 2 carboxyl groups per molecule.

The determination of carboxyl groups is effected each time by acidimetric titration with a methanolic potassium hydroxide solution.

The expression Nl/hour of air means S.T.P. liters/hour.

Pressures to be employed in the oxidative extrusion are those of 1 bar to 100 bar.

The oxidation according to the invention to give polyolefinecarboxylic acids can also be carried out in a kneader at temperatures of 150° C. to 300° C. in the course of 1 to 1000 minutes, preferably 10–1000 minutes, with air throughputs of 10–1000 Nl/hour and pressures of 1 to 100 bar.

The present invention relates to a further process for preparing poly-($C_2$–$C_{10}$-α-olefine)-carboxylic acids, which is characterized in that $C_2$–$C_{10}$-olefines are polymerized with known organometallic mix-catalysts, for example with V(acetylacetonate)$_3$/Al(Cl)-($C_2H_5$)$_2$, in a known manner to molecular weights $\overline{M}w$ (weight averages, measured as explained at the beginning) of about 50000 to about 350000 and are then treated with $CO_2$ at temperatures of $-10°$ C. to $-70°$ C. in the course of 6 to 20 hours under a $CO_2$ pressure of up to 5 bar, the reaction mixture is then acidified with aqueous acid, and the polyolefinecarboxylic acid obtained is separated off.

The new poly-($C_2$–$C_{10}$-α-olefine)-carboxylic acids having molecular weights of 2000 to 350,000 can be used after conversion into the corresponding poly-($C_2$–$C_{10}$-α-olefine)-carbonyl halides, preferably poly-($C_2$–$C_{10}$-α-olefine)-carbonyl chlorides, for preparing polyolefine-polycarbonate block copolymers.

The present invention thus also relates to poly-($C_2$–$C_{10}$-α-olefine)-carbonyl halides, preferably poly-($C_2$–$C_{10}$-α-olefine)-carbonyl chlorides, having molecular weights $\overline{M}w$ (weight averages measured by gel permeation chromatography/viscometry) of 2000 to 350,000, preferably of 70000 to 200000 and in particular of 70000 to 100000.

The present invention also relates to a process for preparing the poly-($C_2$–$C_{10}$-α-olefine)-carbonyl halides, preferably chlorides, of $\overline{M}w$ (weight average as measured above) 2000 to 350,000, which is characterized in that the poly-($C_2$–$C_{10}$-α-olefine)-carboxylic acids according to the invention are reacted with halogenating agents, preferably with chlorinating agents, for example with thionyl chloride, if desired in an organic solvent, for example in aliphatic, cycloaliphatic or aromatic hydrocarbons.

Organic solvents are preferably halogenated or alkylated aromatic hydrocarbons such as toluene or chlorobenzene.

In the absence of solvent, the halogenation takes place in substance, a suspension of the carboxylic acid in the halogenating agent being present.

U.S. Pat. No. 3,135,716 discloses polymers having reactive end groups. These polymers differ from those according to the invention in that they contain double bonds within the polymer chain (column 2, lines 4/5 of U.S. Pat. No. 3,135,716). Their preparation was effected with the aid of anionic polymerization and subsequent functionalization. It is common knowledge that the functionalization of conjugated dienes, vinyl-substituted aromatics or acrylates is possible through anionic polymerization.

Since it is not possible to functionalize poly-($C_2$–$C_{10}$-olefines) by means of anionic polymerization, it thus was not obvious to prepare poly($C_2$–$C_{10}$-α-olefine)carboxylic acids. The synthesis of poly($C_2$–$C_{10}$-α-olefine)-carboxylic acids by oxidative degradation or by Ziegler-Natta catalysis is thus not obvious from U.S. Pat. No. 3,135,716.

DE-AS (German Published Specification) No. 1,150,205 discloses a process for preparing butadiene polymers having end group modification, which differs from the process according to the invention in that the preparation of butadiene polymers with end group modification is effected by polymerization of starters and modifiers of bis-type structure which enter as end groups. The process is characterized in that, to prepare liquid butadiene polymers having a molecular weight of 500 to 15000, not only the starters which form free radicals but also the modifiers used are compounds of bis-type structure which have carboxyl groups in the terminal positions. Poly-($C_2$–$C_{10}$-α-olefines) having end group modification (group transfer polymerization) are not preparable by this process.

U.S. Pat. No. 3,285,949 discloses carboxyl-containing butadiene polymers. They are prepared by solution polymerization of butadiene monomers with an aliphatic azodicarboxylate initiator. This method of preparation differs from the method of preparation as per the present invention in that here the carboxylation of the polybutadiene is effected by means of a carboxyl-introducing initiator. This method of carboxylation is not transferable to poly($C_2$–$C_{10}$-α-olefines).

DE-OS (German Published Specification) No. 2,702,626 describes carboxyl-containing polymers which have an $\overline{M}n$ (number average) of greater than 600, but polyolefinecarboxylic acids which contain no double bonds are not mentioned in said DE-OS (German Published Specification).

The present invention also relates to the use of the poly-($C_2$–$C_{10}$-α-olefine)-carbonyl halides, preferably chlorides, according to the invention for preparing aromatic polyolefine-polycarbonate block polymers.

The present invention thus also relates to a process for preparing aromatic polyolefine-polycarbonate block copolymers, which is characterized in that aromatic polycarbonates of $\overline{M}w$ 2000 to 60000 ($\overline{M}w$ determined by gel permeation chromatography/viscometry) having terminal phenolic OH groups are reacted with the poly-$C_2$–$C_{10}$-α-olefine)-carbonyl halides according to the invention in mixing ratios of 1 to 99% by weight of polycarbonate: 99% by weight to 1% by weight of carbonyl halide, preferably 10 to 90% by weight of polycarbonate: 90 to 10% by weight of carbonyl halide and in particular 90 to 35% by weight of polycarbonate: 10 to 65% by weight of carbonyl halide, at temperatures of 30° C. to 120° C. in inert organic solvents, preferably in chlorinated aliphatic hydrocarbons and in particular in $CH_2Cl_2$ or $CHCl_3$, if desired in the presence of catalysts, and after a reaction time of about 2 hours to about 10 hours the solvent is removed and the block copolymer obtained is purified and isolated.

The present invention also relates to the aromatic polyolefine-polycarbonate block copolymers obtainable by the process according to the invention.

These block copolymers have a number of valuable properties such as, for example, high compatibility in polycarbonate or polyolefine blends (adhesion promotion), and can thus serve as dispersants in incompatible polymer blends.

With respect to the polypropylene-polycarbonate block copolymers according to the invention, the following block structures results:

it-PP-PC:

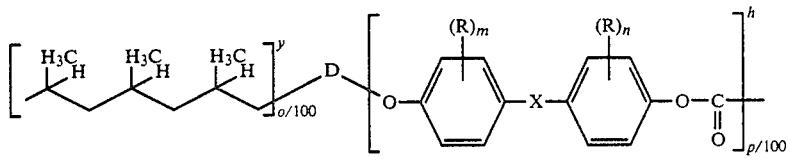

syn-PP-b-PC:

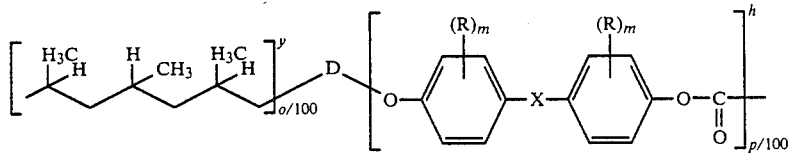

at-PP-b-PC:

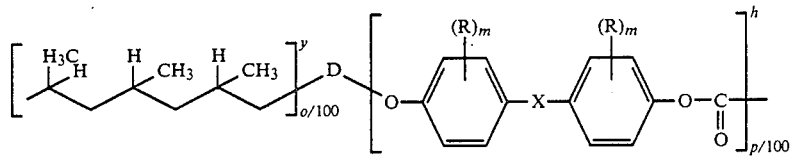

A) m=0, 1, 2

B) R=H, Cl, Br, saturated alkyl substituents having 1–3 C atoms

C) X=a bond, $C_2$–$C_8$-alkylene, $C_2$–$C_8$-alkylidene, $C_5$–$C_{15}$-cycloalkylene, $C_5$–$C_{15}$-cycloalkylidene, $SO_2$, SO, O, CO or

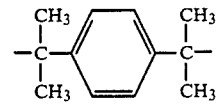

D): C=O-linkage, medially or terminally, preferably terminally

E) O: 1–100

F) P: 100–1

G) O+P: 100

H) Y: 20–400

I) h: 20–400

DE-AS (German Published Specification) No. 1,162,559 discloses block copolycondensates which contain 5 to 95% by weight of polycarbonate blocks and 95 to 5% by weight of polyolefine blocks as copolymerized units, the polyolefine blocks being incorporated via terminal OH groups.

DE-OS (German Published Specification) No. 2,702,626 (Le A No. 17 356) also discloses reacting carboxyl-containing polymers having average molecular weights $\overline{M}w$ (number average of molecular weight, determined for example via the acid number) by the phase boundary process with diphenols and phosgene to polycarbonate elastomers which contain built-in polymer segments. Such polycarbonate elastomers, however, have the disadvantage, compared with the block copolymers according to the invention, that they preferably contain double bonds and thus have disadvantages in the ageing behaviour. Such polycarbonate elastomers have a low softening temperature and, unlike the polyolefine-polycarbonate block copolymers prepared according to the invention, are composed of rigid-flexible segments.

Poly-($C_2$–$C_{10}$)-α-olefines are known. (See for example the review by P. Pino and R. Mulhaupt in Angew. Chem. 11, 869, (1980)).

In the case of the polypropylenes, a distinction is made between isotactic polypropylene (see for example DE-OS (German Published Specification) No. 2043508) syndiotactic polypropylene (see for example E. A. Youngmann, J. Boor, Jr. Macromol. Rev. 2, 33 (1967) and atactic polypropylene (see for example W. Dörrscheidt et al., Kunststoffe 66, 572, (1976).

Further suitable starting poly-α-olefines are for example polyethylenes, polyisobutylenes and also copolymers of ethylene, propylene, hexene, butene and/or isobutylene.

They are described for example in the abovementioned review by P. Pinot and R. Mulhaupt, loc. cit., and in "Polyisobutylen" [Polyisobutylene], H. Güterbock, Springer Verlag, Heidelberg, 1959.

Poly-($C_2$–$C_{10}$-α-olefine)-carboxylic acids obtainable according to the invention are thus for example polyethylenedicarboxylic acids, polypropylenedicarboxylic acids, polyisobutylenecarboxylic acids, caboxylic acids of copolymers of ethylene and propylene, carboxylic acids of copolymers of ethylene and butene and carboxylic acids of terpolymers of ethylene, propylene and hexene.

They are characterized by their molecular weight (gel permeation chromatography/viscometry) $\overline{M}w$, preferably of 2,000 to 350,000, and they are colourless to yellowish products having a COOH functionality, determined by methanolic potassium hydroxide titration, between 0.5 and 2.0 per molecule. They have [η] viscosities of 10 to 70 cm³/g. The nonuniformities $$U = \frac{\overline{M}w}{\overline{M}n} - 1$$

are between 2.0 and 4.5. Their softening points are in general between 100° C. and 200° C.

Poly-($C_2$–$C_{10}$-α-olefine)-carbonyl dihalides obtainable according to the invention are consequently for example polyethylenedicarbonyl dichlorides, polyethylenedicarbonyl dibromides, polypropylenedicarbonyl dichlorides, polyisobutylenecarbonyl chlorides and carbonyl chlorides of copolymers of ethylene and propylene and carbonyl bromides of copolymers of ethylene and butene, and the like.

The poly-($C_2$–$C_{10}$-α-olefine)-carbonyl halides obtainable according to the invention are slightly yellowish products having a chlorine content between 0.3 and 2.0% by weight. They have [η] viscosities of 10 to 70 cm³/g. The nonuniformities $$U = \frac{\overline{M}w}{\overline{M}n} - 1$$

are between 2.0 and 4.5. The softening points are in general between 100° C. and 200° C.

Aromatic polycarbonates having weight average molecular weights $\overline{M}w$ (determined as described above) of 2000 to 60000 and terminal phenolic OH groups are likewise known. (See for example H. Schnell, Angew. Chem., 68, pages 633–640 (1956), H. Schnell, "Chemistry and Physics of Polycarbonates", Interscience Publishers 1954, Volume 9 of Polymer Reviews and H. Krimm in Houben Weyl, Methoden der organischen Chemie [Methods of Organic Chemistry], Volume XIV/2, Macromolecular Substances, part 2, 1963, pages 48–56).

They are prepared for example by phase boundary condensation of bisphenol-A and phosgene in a known way without chain terminators.

The aromatic polyolefine-polycarbonate block copolymers obtainable according to the invention can be processed, after purification and isolation, into mouldings in the customary mixing apparatuses such as rolls, kneaders, single- and multiple-shaft extruders.

The processing temperatures should preferably not exceed 250° C.

They can additionally have added to them in a known manner additives such as, for example, lubricating and mould release agents, nucleating agents, stabilizers, fillers, reinforcing materials, flameproofing agents or dyestuffs.

Preferred fillers which can also have a reinforcing action are glass balls, mica, silicates, quartz, talcum, titanium dioxide, wollastonite.

Suitable flameproofing agents are for example polyhalogenodiphenyl, polyhalogenodiphenyl ethers, polyhalogenophthalic acid, polyhalogenooligocarbonates and polyhalogenopolycarbonates.

The aromatic polyolefine-polycarbonate block copolymers obtainable according to the invention find industrial utility for example as adhesion promoters, compatibility improvers or dispersants in incompatible, thermoplastic polymer mixtures such as, for example, polycarbonate/polypropylene blends (see in this context: J. Henschen, R. Jerome, Ph. Tessie, Macromolecules 14, 242 (1981) and references cited there).

General description of the preparation of carboxyl-containing, isotactic polypropylene:

A) Oxidation in extruder

1) An extruder (ZSK 32) having a length-diameter ratio LD=40 is charged with 6000 g/h of isotactic polypropylene having an average molecular weight of 340000, heated to 250°–260° C. and injected with 1500 NL/hour of air under pressure. Downstream of the air injection zone the cylinder temperature of the extruder is maintained at 210° C. Excess air leaves in the degassing zone, and the degraded polypropylene is spun off at the die.

BRIEF DESCRIPTION OF DRAWING

The accompanying FIGURE shows the six zones of the extruder and its functions and also the three openings, as follows:

1. intake zone—length 150 mm temperature 60° C.
2. heating-up zone—length 150 mm temperature 180° C.
3. injection zone—length 100 mm temperature 250° C.
4. oxidation zone—length 550 mm temperature 210° C.

5. degassing zone—length 300 mm temperature 200° C.
6. extrusion zone—length 80 mm temperature 190° C.
7. is the filler inlet opening
8. is the air supply
9. is the degassing opening.

After the first extrusion with oxidative degradation the product has the following molecular data:

| $[\eta]$visc. /cm$^3$/g/ | $[\eta]$GPC /cm$^3$/g/ | $M_n$ /kg/mol/ | $M_w$ /kg/mol/ | U | $f_{COOH}$ /n/mol/ |
|---|---|---|---|---|---|
| 68 | 57 | 22 | 113 | 4.17 | 0.7 |

This previously degraded polypropylene is extruded once more in the same way and then has the following molecular data:

| $[\eta]$visc. /cm$^3$/g/ | $[\eta]^3$PC /cm$^3$/g/ | $M_n$ /kg/mol/ | $M_w$ /kg/mol/ | U | $f_{COOH}$ /n/mol/ |
|---|---|---|---|---|---|
| 50 | 42 | 23 | 94 | 3.1 | 1.2 |

A further oxidative treatment in the extruder gives a product having the following data:

| $[\eta]$visc. /cm$^3$/g/ | $[\eta]$GPC /cm$^3$/g/ | $M_n$ /kg/mol/ | $M_w$ /kg/mol/ | U | $f_{COOH}$ /n/mol/ |
|---|---|---|---|---|---|
| 45 | 40 | 13 | 70 | 4.3 | 1.5 |

The polypropylene used as the starting material had a nonuniformity of 9.4 and was the commercial product Vestolen P 4200 ®.

(B) Oxidation in kneader

A kneader having a capacity of 5 ltrs. is charged with 3 kg of isotactic polypropylene having a molecular weight of 340000. This is followed at 210° C. by kneading and injection of 400 Nl/h of compressed air. By means of a pressure-keeping valve the pressure is maintained in the kneader at 5 bar.

After 1 hour of kneading the kneader is let down and emptied. The product has the following molecular data:

| $[\eta]$visc. cm$^3$/g/ | $[\eta]$GPC cm$^3$/g/ | $M_n$ kg/mol/ | $M_w$ kg/mol/ | U | $f_{COOH}$ |
|---|---|---|---|---|---|
| 28 | 30 | 3 | 70 | 3.4 | 1.8 |

The polypropylene used as the starting material was again Vestolen P 4200 ®.

1ST EXAMPLE

Polypropylenecarboxylic Acid (Syndiotactic or Atactic)

In a 350 ml autoclave (gas inlet, injection device, stirring, pressure up to 5 bar), 140 ml of dry toluene and 330 mg (0.34 mmol) of anisole are stirred under nitrogen (2 bar) at a temperature of −40° C. 50 g (1.2 mol) of propylene are added, and the temperature is reduced to −60° C. with constant stirring. 94 mg (0.78 mmol) of diethylaluminium chloride in 10 ml of toluene and 234 mg (0.678 mmol) of vanadium triacetylacetonate in 10 ml of toluene are then added in the above order. The duration of the polymerization is 48 h at −65° C. After 33 h carbon dioxide (3 bar) was injected for 5 minutes at −65° C., which was followed by further stirring. Precipitating with ethanol gives a colourless product. The yield is 21 g (42% of theory). The functionality of the polypropylenecarboxylic acid was 0.5.

2ND EXAMPLE

Polyolefinecarbonyl Chloride 10 g of polypropylenecarboxylic acid (m$_n$=23,000, Mw/Mn−1=4.3, f=1.6) are heated at 100° C. in 80 ml of distilled toluene under nitrogen in a 250 ml three-neck flask (thermometer, nitrogen inlet, KPG stirrer, reflux condenser). A clear solution forms within 30 minutes, and 20 ml of colourless thionyl chloride, distilled over linseed oil, are added dropwise in the course of 30 min. This is followed by stirring at 80° C. for 2 h until the hydrogen chloride and sulphur-dioxide evolution has ended. Thionyl chloride is finally distilled off. Washing of the residue with cold toluene is continued until thionyl chloride odour is no longer detectable. The yield is 9.5 g (95% of theory).

3RD EXAMPLE

Polypropylene-polycarbonate Block Polymer 10 g of polypropylenecarboxylic acid (M$_n$=23000, Mw/Mn−1=4.3, f=0.3−2.0) are heated at 100° C. in 80-100 ml of distilled toluene under nitrogen in a 250 ml three-neck flask (thermometer, nitrogen inlet, KPG stirrer, reflux condenser). A clear solution forms in the course of 30 minutes, and 20 ml of colourless thionyl chloride, distilled over linseed oil, are added dropwise in the course of 30 min. Stirring is continued at 80° C. for 2 h until the HCl and sulphur dioxide evolution has ended. Thionyl chloride is finally distilled off, and at 70°-75° C. 5 g of OH-containing bisphenol A homopolycarbonate (Mw of about 28000, measured via $\eta$rel or light scattering), dissolved in chloroform, are added dropwise in the course of 1.5 h. Stirring is then continued at 80° C. for 2 h, and the solution is concentrated at 70° C. in vacuo. The residue is once more dissolved in toluene, and subsequent removal of the toluene in a rotary evaporator leads to a colourless product in a yield of 11.6 g (97% of theory). After fractionation and identification by IR spectroscopy the product was 77% by weight of block copolymer of $\overline{M}w$ about 50,000.

EXAMPLE 4

Example 3 is repeated except for the following changes.

a) The polypropylenecarboxylic acid solution to which thionyl chloride is added has additionally added to it 0.05 ml of dimethylformamide.

b) A heatable high-precision dropping funnel is used to add the polypropylenecarboxylic acid solution prepared in Example 3 in the course of 40 minutes to a solution warmed up to 60° C. of 2 g of the polycarbonate of Example 3 in 100 ml of chloroform.

The yeild is 11.9 g (98% of theory). After fractionation in dimethylformamide/methylcyclohexane is 77% by weight of block copolymer of $\overline{M}w$ about 60,000.

EXAMPLE 5

2 g of polycarbonate of Example 3 are dissolved at room temperature in 100 ml of chloroform. To this solution is added at the boil 1 ml of thionyl chloride which has been distilled over linseed oil, and the mixture is refluxed for 45'. Initially voluminous HCl and sulphur dioxide vapours evolve. This reaction product is added dropwise at 70°-80° C. to a hot solution of 10 g of polypropylenecarboxylic acid (see Example 3) in 50 ml of toluene in the course of 20 minutes. This is followed by 2 hours of heating and stirring at 70° C.

The solvents are then evaporated to dryness at 60° C. in the vacuum of a rotary evaporator. The yield is 12 g (100% of theory); fractionation in dimethyl-formamide/methylcyclohexane gives 78% by weight of block copolymer of $\overline{M}w$ about 50,000.

Concerning the fractionation carried out in Examples 3 to 5, see for example R. Kuhn, Makromolekulare Chemie, 177, 1525 (1976).

EXAMPLE 6

In a 300 ml autoclave (gas inlet, injection device, stirring, pressure up to 5 bar), 140 ml of dry toluene and 330 mg (0.34 mmol) of anisole are stirred under nitrogen (2 bar) at a temperature of −40° C. 50 g (85, 1.2 mol) of propylene are added, and the temperature is reduced to −60° C. with constant stirring. 94 g (0.78 mmol) of diethylaluminium chloride in 10 ml of toluene and 234 mg (0.678 mmol) of vanadium triacetylacetonate in 10 ml of toluene are then added in the stated order. The duration of the polymerization is 10–48 hours at −65° C. The result obtained is a "living", essentially syndiotactic propylene (13C=NMR-O-DCB rr=0.05–0.7; rm=0.2–0.5, mm=0.1–0.2). Sampling after 30 minutes, 60 minutes and 100 minutes gave viscosities (dl/g) of y=0.08, y=0.102 and y=0.15 (in each case measured in toluene at 22° C.).

In total molecular weights $\overline{M}w$ of 15000 to 300000 are obtained, the yield being 6.7 g (13.4% of theory).

The reaction product is subsequently treated with carbon dioxide at temperatures of −70 to −10 and pressures of 0 to 5 bar for 5 to 60 minutes.

The reaction mixture is then treated with aqueous acid, and the polypropylenecarboxylic acid filtered off. This gives a rubberlike, slightly greenish product having a softening temperature of 120° C. (yield 21 g, 42% of theory).

Conversion into the polypropylenecarbonyl chloride is effected by heating 10 g of polypropylenecarboxylic acid (see above) in a 250 ml three-neck flask (thermometer, nitrogen inlet, KPG stirrer, reflux condenser) at 100° C. in 80 ml of distilled toluene under nitrogen. A clear solution forms within 30 minutes, and 20 ml of thionyl chloride are added dropwise in the course of 30 minutes. Stirring is continued at 80° C. for 2 hours until the hydrogen chloride and sulphur dioxide evolution has ended. Thionyl chloride is subsequently distilled off. The residue is washed with cold toluene until thionyl chloride odour is no longer detectable.

Thereafter 9 g of polypropylenecarbonyl chloride are dissolved in 60 ml of toluene and mixed at 50° C. in a 250 ml three-neck flask with 1 g of OH-containing bisphenol A homopolycarbonate of $\overline{M}w$ 28,000 of Example 3 in 5 ml of $CH_2CH_2$. This is followed by 48 hours of refluxing. Finally, the polymer is precipitated in alcohol and dried at 60° C. in vacuo for 10 hours. Yield after fractionation in dimethylformamide/methylcyclohexane: 44% by weight of block copolymer having an $\overline{M}w$ of about 280,000.

We claim:

1. A process for the production of a polyolefine-polycarbonate block copolymer, in which an aromatic polycarbonate of $\overline{M}w$ 2,000 to 60,000 having terminal phenolic OH groups is reacted with a poly-($C_2$-$C_{10}$-α-olefine)-carbonyl halide having a weight average molecular weight of 2,000 to 235,000 in a mixing ratio of 1 to 99% by weight of polycarbonate: 99% by weight to 1% by weight of carbonyl halide at a temperature of 30° C. to 120° C. in an organic solvent which is inert under the reaction conditions, the solvent is removed after a reaction time of 2 hours to 10 hours, and the block copolymer obtained is purified and isolated.

2. A process according to claim 1, in which the reaction is carried out in the presence of a catalyst.

3. A process according to claim 1, in which the organic solvent is $CH_2Cl_2$ or $CHCl_3$.

4. A process according to claim 1, in which the mixing ratio is 10 to 90% by weight of polycarbonate: 90 to 10% by weight of carbonyl chloride.

5. A process according to claim 4, in which the mixing ratio is 90 to 35% by weight of polycarbonate: 10 to 65% by weight of carbonyl chloride.

* * * * *